United States Patent [19]

Chantelou

[11] Patent Number: 4,896,212

[45] Date of Patent: Jan. 23, 1990

[54] METHOD OF PROCESSING VIDEO SIGNALS WHICH ARE SAMPLED ACCORDING TO A SAMPLING PATTERN HAVING AT LEAST ONE OMITTED ELEMENT WHICH DIFFERS FROM PICTURE FRAME TO PICTURE FRAME AND A VIDEO SIGNAL CONVERTER FOR PUTTING THIS METHOD INTO EFFECT

[75] Inventor: Olivier Chantelou, Paris, France

[73] Assignee: U.S. Philips Corporation, New York, N.Y.

[21] Appl. No.: 197,366

[22] Filed: May 23, 1988

[30] Foreign Application Priority Data

Jun. 4, 1987 [FR] France ................... 87 07794

[51] Int. Cl.⁴ .......................... H04N 7/12; H04N 7/01
[52] U.S. Cl. ...................................... 358/138; 358/140; 358/160
[58] Field of Search ................ 358/140, 138, 160, 181

[56] References Cited

U.S. PATENT DOCUMENTS

| | | | |
|---|---|---|---|
| 4,068,266 | 1/1978 | Liao ................................. | 358/140 X |
| 4,245,250 | 1/1981 | Tiemann ............................ | 358/140 |
| 4,292,653 | 9/1981 | Bock et al. ......................... | 358/140 |
| 4,568,964 | 2/1986 | Doornhein ......................... | 358/140 X |
| 4,598,314 | 7/1986 | Reimers ............................. | 358/140 |
| 4,636,857 | 1/1987 | Achiha et al. ...................... | 358/140 |
| 4,658,284 | 4/1987 | Kawamura et al. ............. | 358/140 X |
| 4,733,300 | 3/1988 | Sugiyama et al. .................. | 358/140 |
| 4,740,842 | 4/1988 | Anngarn et al. ................. | 358/140 X |
| 4,745,458 | 5/1988 | Hirano et al. .................... | 358/140 X |
| 4,751,573 | 6/1988 | Kubota ............................... | 358/140 |
| 4,768,092 | 8/1988 | Ishikawa ............................. | 358/140 |

FOREIGN PATENT DOCUMENTS

0169527 1/1986 European Pat. Off. .
8502080 5/1985 PCT Int'l Appl. .

*Primary Examiner*—James J. Groody
*Assistant Examiner*—Victor R. Kostak
*Attorney, Agent, or Firm*—Edward W. Goodman

[57] ABSTRACT

A method of processing video signals which are sampled according to a sampling network which differs from picture to picture and a video signal converter for putting this method into effect.

A video signal converter for putting into effect a method of processing a video signal which has been sampled according to a sampling pattern which differs from picture to picture. This converter includes:

(a) a spatial filtering circuit which is an interpolation circuit (30);
(b) a selection circuit having a first memory (10) which delays the input signal by the duration of a picture, a second memory (20) for delaying the output of the first memory by the duration of a picture, first and second delay circuits (40 and 50), and a sorting circuit (60) which receives at its three inputs the output signal of the second delay circuit, the output signal of the interpolation circuit, and the output signal of the first delay circuit, respectively; and
(c) a final picture recovery circuit, having a third delay circuit (70) and a multiplexing circuit (80).

9 Claims, 1 Drawing Sheet

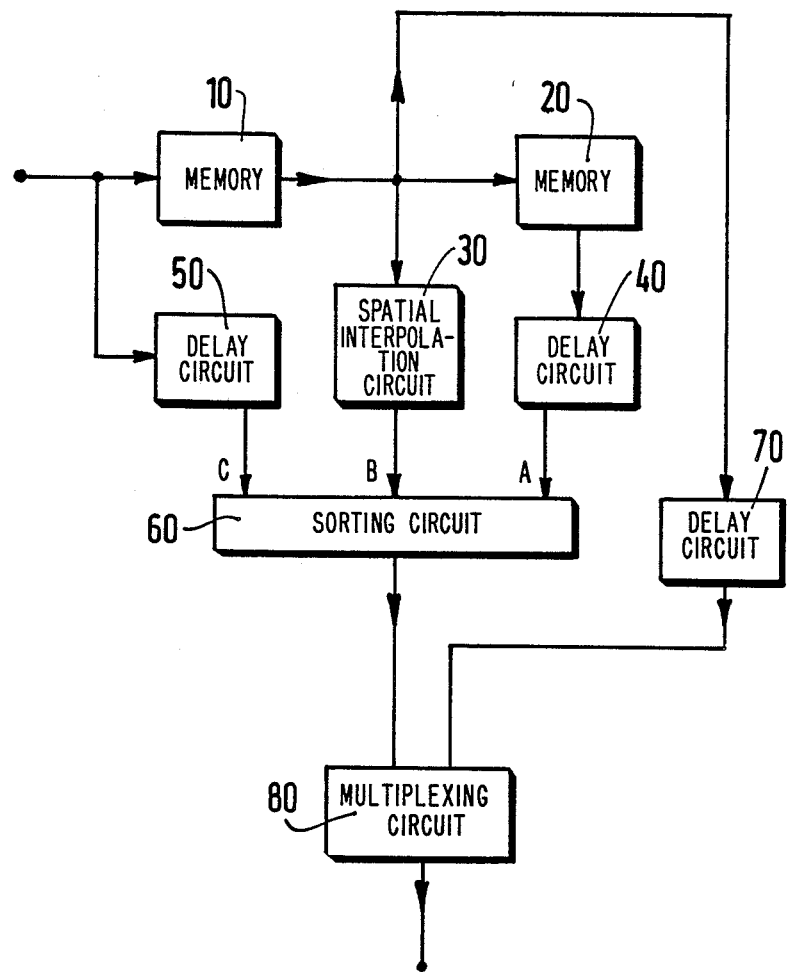

METHOD OF PROCESSING VIDEO SIGNALS WHICH ARE SAMPLED ACCORDING TO A SAMPLING PATTERN HAVING AT LEAST ONE OMITTED ELEMENT WHICH DIFFERS FROM PICTURE FRAME TO PICTURE FRAME AND A VIDEO SIGNAL CONVERTER FOR PUTTING THIS METHOD INTO EFFECT

BACKGROUND OF THE INVENTION

The present invention relates to a method of processing video signals which are sampled according to a sampling pattern having at least one omitted element which differs from picture frame to picture frame, including, inter alia, a switched video signal selection operation.

The invention also relates to a video signal converter for putting the method into effect.

The direct broadcasting of high-definition television pictures requires a passband which is not compatible with the present-day possibilities of the transmission channels. It is therefore necessary, in order to broadcast such pictures, to reduce this passband by sub-sampling.

In order to obtain nevertheless, on reception, a picture quality which is close to the starting quality in the case of still picture, the currently proposed sampling structures (see for example the laboratory report "A single channel HDTV broadcast system: the MUSE, by Y. Ninomiya et al., no. 304, September 1984, distributed by the firm of NHK, Tokyo, 157 Japan) provides the use of a first sampling pattern for even pictures and a different one, interlaced with the first, for the odd pictures. The complete resolution is then obtained again on reception by accumulating the samples of the two consecutive pictures. In the case of moving pictures, an interpolation in the current picture is furthermore provided.

The periodical "Radio Mentor Elektronik", no. 5, 1975, pages 196, describes a method and an arrangement for processing video signals in which, more specifically, a video signal selection operation is provided. This selection operation, which is associated with a subsequent decision operation, is realized in a non-linear filter which, when made operative, renders it possible to obtain a picture of a correct quality. It is, however, a known fact that such processing methods, using motion detection, nevertheless generate faults such as the flicker phenomenon in the switching points.

SUMMARY OF THE INVENTION

The invention has for its object to provide an improved processing method which still utilizes a selection type operating mode but which avoids having recourse to a decision operation.

To this effect, a processing method according to the invention is characterized in that it comprises the following operations:

(a) spatial filtering by calculating, in each omitted element to be generated of a current picture frame, a value which results from weighting the values of elements adjacent to the omitted element in the same line of the current picture frame and of elements which are also adjacent to the omitted element but occur in at least two neighboring lines of the current line of the current picture frame;

(b) selection by sorting and choosing the intermediate value from amongst several values thus sorted, this sorting operation being effected among several values of which one is the value obtained at the end of the spatial filtering operation and the others are those of elements in the same position as the omitted element of the current line but occurring at least in the picture frame preceding it and in the picture frame subsequent to the current picture frame;

(c) recovery of the picture by generating a video signal which is sampled according to the sampling pattern having all elements present for all the pictures, the elements of each picture frame comprising, alternatively the corresponding element of the initial picture frame when this corresponding element exists and an element which is generated in accordance with the preceding filtering and selection operations when this corresponding element is not present in the initial picture frame.

The method thus proposed is advantageous in the sense that its basic principle, which exists in acting by sorting the values and not by decision, effectively avoids the flicker phenomena occurring at the switching points in embodiments which make use of the prior art methods. Moreover, when still pictures are concerned, the use of this procedure does not result in any loss of spatial resolution, while, in the case of moving pictures, the absence of weighting in the direction of the time axis avoids substantially any smear effects.

This method is of particular interest for use in the field of television. A video signal converter for implementing the method of the invention may comprise, when used in television, a spatial filtering circuit, a video signal selection circuit and a circuit for recovering the final picture. Put more accurately, in a preferred embodiment of the invention, the converter is characterized in that:

(a) the spatial filtering circuit includes an interpolation circuit which operates by weighting the signals which are associated with a current element of a current picture line, with elements adjacent to the element in the same line and with elements which are also adjacent to the element but occur in at least two lines adjacent to the current line of the current picture frame;

(b) the selection circuit includes a first memory which delays the input signal by the duration of a picture frame, a second memory for delaying the output of the first memory by the duration of a picture frame, first and second delay circuits whose inputs are connected, as regards to first of these circuits, to the input of the first memory and, as regards the second of these circuits, to the output of the second memory, and a sorting circuit which at its three inputs receives the output signal of the second delay circuit, the output signal of the interpolation circuit, and the output signal of the first delay circuit, respectively; and (c) the final picture recovering circuit includes a third delay circuit and a multiplexing circuit.

BRIEF DESCRIPTION OF THE DRAWING

Particulars and advantages of the invention will become apparant in a more detailed manner from the following description and from FIG. 1, which is given by way of non-limitative example and which shows a preferred embodiment of a video signal converter according to the invention.

DESCRIPTION OF THE PREFERRED EMBODIMENT

The method according to the invention includes a spatial filtering operation, a selection operation, and an operation for generating output signals by multiplexing the elements of the basic picture and of the restored elements.

The spatial filtering operation consists, based on the input signals constituted by the consecutive digital samples of the sampled video signals, of calculating for each element to be generated in a current line, a value which results from weighting those values of adjacent elements occurring the current line or in lines adjacent to this current line in the same field. The number of adjacent lines which may thus be used is currently equal to two, but this number may be different without departing from the scope of the invention. It should be noted that the particular weighting scheme is not a factor of the present invention.

The selection operation consists of effecting a sorting action from three values, one of which is the value of the interpolation signal supplied at the end of the spatial filtering operation described above and the other two values being those elements to the same position as that of the current line for which the interpolation signal has just been determined but which occur in the picture frame which precedes and the picture frame which follows, respectively, the picture frame containing this current line. The nature of the sorting operation effected is, put more precisely, the choice of that one of three values which occupies the intermediate rank. This selection by sorting and choosing the intermediate value can indeed be effected on a different number of values, odd or even.

The video signal generating operation finally consists in a recovery of the final picture frame in which each element corresponds either to an element of the original picture frame, or to a generated element as indicated in the foregoing, that is to say by inter-picture interpolation and by inter-picture sorting operations which are successively effected.

An embodiment of a video signal converter for putting the method described in the foregoing into effect is now proposed in FIG. 1. This converter first of all comprises a spatial filtering circuit. A first memory 10 delays the input signal by a picture frame period, and a second memory 20 delays again the output of the first memory 10 by a picture frame period. As the input signal is a sampled video signal which corresponds to a sequence of sampled picutures frames in accordance with two different patterns, the two signals at the input and at the output of the memory 10 corresponds to two elements which have the same spatial position in the picture frame, and the same applies to the two signals at the input and at the output of the memory 20. The two signals at the input of the memory 10 and at the output of the memory 20 are shifted through exactly two picture frame periods with respect to each other. The filtering circuit is a spatial interpolation circuit 30 which calculates in each element, for example to be generated, a corresponding value for the signal by weighting the signals of elements adjacent to the element to be generated in the picture.

The converter according to the invention also includes, in association with the spatial filtering circuit, a signal selection circuit composed of the two memories 10 and 20, two delay circuits 40 and 50, and a sorting ciruit 60. This sorting circuit 60 receives at its inputs A, B, C three signals each separated by a picture frame period:

the signal at the input B is the interpolation signal supplied for the current field by the spatial interpolation circuit 30;

the signal at the input A and the signal at the input C are the two signals which spatially correspond to the same element as that on the input B but occurring in the picture frame preceding it and the picture frame subsequent to the current picture frame, respectively.

The delay circuits 40 and 50 are provided to compensate for any delay introduced by the interpolation operation of the circuit 30 and guarantee the realignment versus time of the signals appearing at the inputs A, B, C. The sorting circuit 60 then chooses, for each element, that one of the three values that occupies the intermediate position and validates the corresponding signal.

The converter according to the invention finally includes a final picture recovery circuit. This circuit is formed, on the one hand, by a third delay circuit 70 and, on the other hand, by a multiplexing circuit 80. The delay circuit 70 plays a part, as do also the circuits 40 and 50, in the realignment versus time of the signals appearing at the inputs of the multiplexing circuit 80. This multiplexing circuit 80 allows interlacing of the current samples outputted by the delay circuit 70 and the recovered samples available at the output of the sorting circuit 60, and that as a function of the relative position of the two sampling patterns of the basic picture frames.

What is claimed is:

1. A method of processing input video signals which are sampled according to a sampling pattern having at least one omitted element which differs from picture frame to picture frame, said method including the steps:
    intra-picture spatially filtering video signals of a current picture frame for obtaining spatially filtered video signals of said current picture frame;
    median filtering said spatially filtered video signals of said current picture frame, video signals of a picture frame preceding said current picture frame, and video signals of a picture frame subsequent to said current picture frame for obtaining median filtered video signals; and
    multiplexing said median filtered video signals and said video signals of said current picture frame for obtaining video signals which are sampled according to said sampling pattern having all elements present for all picture frames.

2. The method of processing video signals as claimed in claim 1, wherein said intra-picture spatially filtering comprises weighting values of elements of said current picture frame occurring adjacent to said omitted element to be generated in a current line and values of elements of said current picture frame occurring adjacent to said omitted element to be generated in lines neighboring said current line.

3. The method of processing video signals as claimed in claim 1, wherein said multiplexing includes delaying said video signals of said current picture frame for realignment, with respect to time, with said median filtered video signals.

4. A converter for processing input video signals which are sampled according to a sampling pattern having at least one omitted element which differs from picture frame to picture frame, said converter comprising:

means for intra-picture spatially filtering video signals of a current picture frame for obtaining spatially filtered video signals of said current picture frame;

means for median filtering said spatially filtered video signals of said current picture frame, video signals of a picture frame preceding said current picture frame, and video signals of a picture frame subsequent to said current picture frame for obtaining median filtered video signals; and means for multiplexing said median filtered video signals and said video signals of said current picture frame for obtaining a video signal which is sampled according to said sampling pattern having all elements present for all picture frames.

5. The converter as claimed in claim 4, wherein said intra-picture spatially filtering means comprises means for weighting values of elements of said current picture frame occurring adjacent to said omitted element to be generated in a current line and for weighting values of elements of said current picture frame occurring adjacent to said omitted element to be generated in lines neighboring said current line.

6. The converter as claimed in claim 5, wherein said means for median filtering comprises:

a first memory to which said input video signals are applied, said first memory delaying said input video signals for a duration of one picture frame period;

a second memory to which output signals of said first memory are applied, said second memory delaying said output signals of said first memory for a duration of one picture frame period;

a sorting circuit having inputs for receiving said input video signals, said spatially filtered signals, and output signals of said second memory, said sorting circuit comprising means for determining a median one of the signals applied to the inputs thereof and for passing the determined median signals to an output of said sorting circuit, wherein said output signals of said first memory are applied to said intra-picture spatially filtering means as the video signals of said current picture frame.

7. The converter as claimed in claim 6, wherein said converter further comprises first and second delay circuits for respectively delaying said input video signals being applied to said sorting circuit and the output signals of said second memory, said first and second delay circuits realigning, with respect to time, the signals applied thereto with said spatially filtered signals.

8. The converter as claimed in claim 7, wherein said means for multiplexing comprises a multiplexer for receiving output signals of said sorting circuit and the output signals of said first memory.

9. The converter as claimed in claim 8, wherein said converter further comprises a third delay circuit connected between said first memory and said multiplexer for realigning, with respect to time, the video signals of said current picture frame with the output signals of said sorting circuit.

* * * * *